United States Patent
Reich

(10) Patent No.: US 7,463,183 B2
(45) Date of Patent: Dec. 9, 2008

(54) PANORAMIC WARNING SYSTEM FOR HELICOPTERS

(75) Inventor: Alexander Reich, Muenchen (DE)

(73) Assignee: Eurocopter Deutschland GmbH, Donauworth (DE)

( * ) Notice: Subject to any disclaimer, the term of this patent is extended or adjusted under 35 U.S.C. 154(b) by 0 days.

(21) Appl. No.: 11/938,937

(22) Filed: Nov. 13, 2007

(65) Prior Publication Data

US 2008/0180310 A1    Jul. 31, 2008

(30) Foreign Application Priority Data

Nov. 10, 2006  (DE) .................. 10 2006 053 354

(51) Int. Cl.
*G01S 13/93* (2006.01)
(52) U.S. Cl. .................................. 342/29
(58) Field of Classification Search ............ 342/29, 342/30, 176
See application file for complete search history.

(56) References Cited

U.S. PATENT DOCUMENTS

| | | | | |
|---|---|---|---|---|
| 5,313,201 A | * | 5/1994 | Ryan | 342/29 |
| 5,451,957 A | * | 9/1995 | Klausing | 342/29 |
| 2004/0119633 A1 | * | 6/2004 | Oswald et al. | 342/70 |
| 2004/0178943 A1 | * | 9/2004 | Niv | 342/29 |

FOREIGN PATENT DOCUMENTS

| | | |
|---|---|---|
| DE | 3337649 | 4/1985 |
| DE | 19901847 | 2/2000 |
| DE | 202006009330 | 8/2006 |

* cited by examiner

*Primary Examiner*—Dan Pihulic
(74) *Attorney, Agent, or Firm*—Darby & Darby

(57) ABSTRACT

A panoramic warning system for helicopters, for the purpose of detecting obstacles and the proximity of the ground by using a plurality of radar sensors connected to the fuselage structure of the helicopter and which operate on varying wavelengths, the signals of which, representing range information, which are provided with an individual identifier, are compared in a central identification-and-evaluation unit with predetermined warning thresholds and after the assignment to corresponding scan sectors are caused to be displayed on at least one cockpit display.

8 Claims, 4 Drawing Sheets

PANORAMIC WARNING SYSTEM FOR HELICOPTERS

Priority is claimed to German Patent Application No. 10 2006 053 354.2, filed on Nov. 10, 2006, the entire disclosure of which is incorporated by reference herein.

The present invention relates to a panoramic warning system for helicopters for the purpose of detecting obstacles and the proximity of the ground by means of radar beams.

BACKGROUND

It is known to detect obstacles from a helicopter with a scanning radar beam or laser beam, and also to determine distances from the ground with a radar altimeter. But obstacle-detection systems based on laser technology are highly dependent on the weather.

SUMMARY OF THE INVENTION

An object underlying the present invention is to provide a novel, combined, active system for detecting obstacles and terrain, which by using radar beams is able to detect obstacles, in particular also cross-country transmission lines and mountain edges, in a manner suitable for all weathers and better than hitherto, and is able to display such obstacles to the pilot.

Within the scope of the invention the novel system is designated as an OTPS (Obstacle and Terrain Proximity Sensing) system.

The assignment, according to the invention, of individual radar sensors operating on varying wavelengths for various distances or ranges (short range and long range) to predetermined scan sectors of the sphere surrounding the helicopter, and the integration thereof into an overall system, results in complete coverage of the relevant helicopter environment, which is not possible with a single scanning radar beam. Hence safety at take-off and landing in difficult terrain and under adverse visibility conditions is enhanced, the operational spectrum is enhanced by warning against collisions during the landing approach of the helicopter in poor visibility, and the awareness of the situation by the pilots in the course of complicated maneuvers is enhanced. The radar sensors that find application are small components that operate reliably—such as are known, for example, from the distance-warning system in vehicle engineering—and permit a simple and flexible attachment to the structure of the helicopter. These radar sensors operate merely as send-and-receive units and provide their signals to an identification-and-evaluation unit which supplies the display units installed in the cockpit, the so-called cockpit displays. This may be effected either directly or via an interposed symbol generator. It has proved particularly advantageous if the wavelength 24 GHz is used for the short-range waveband and if the wavelength 77 GHz is used for the long-range waveband.

The installation of the radar sensors into the respective helicopter structure is effected while taking account of the prescribed installation conditions and the system requirement for panoramic coverage of the warning system, the short-range sensors being provided for the sides, for the lower and rear regions of the fuselage structure, and the long-range sensors being provided for the front region—that is to say, the nose of the helicopter.

For the purpose of labeling, differentiation between different aircraft, and correct sector allocation of the signals generated by the radar sensors, these signals are given an identifier—a so-called footprint—by means of amplitude modulation or frequency modulation. The typical switching of the radar sensors on and off is controlled by the central identification-and-evaluation unit; the latter compares the signals of the radar sensors with appropriately adjustable warning thresholds. If a warning threshold has been fallen short of, this information is communicated to the cockpit display with a labeling of the sector in question and with the measured range. The warning thresholds are adjustable, preferably via an external data-link circuit.

With the aid of the panoramic warning system according to the invention a good detection of obstacles, especially also of cross-country transmission lines and mountain edges, becomes possible. By virtue of the panoramic coverage, the probability of vertical incidence of the radar beams on cross-country transmission lines that are possibly present is increased, which significantly improves the probability of detection in comparison with prior systems. Such a detection of the lateral distance from mountain edges has, for example, previously not been possible at all.

As mentioned, the representation of the results of measurement of the radar sensors is effected after editing of the data supplied by said sensors. This editing relates to the sector in question, to the conversion of the sector information into a corresponding display, to the evaluation of the measured range at which the obstacle was detected, and to the hazard rating of the range indication, preferably by means of red/yellow coloring of the display. To this end, the radar sensors emit their measured range values plus their footprints, which are collected and processed by the central identification-and-evaluation unit before they are forwarded to the displays in the form of display data. To this end, in an unidirectional display, for example, which can also be used ordinarily as a hovering-flight display, the horizontal hazard per sector is represented by a coloring in yellow and red. If the display is effected in a navigation-and-mission display, in the case of a hazard—that is to say, if a predetermined warning threshold has been fallen short of—ellipses are represented, colored red or yellow, in range and in direction relative to the helicopter symbol. But it is also possible to combine the aforementioned representations into a joint display that shows the entire spatial hazard picture of the helicopter. In this display the ranges to the perceived obstacles are inserted numerically, these numbers being capable of being set in ft or m. These scales furthermore have range-dependent bars which are yellow or red, depending on the degree of hazard. The directions represented on the display are right, rearward, left and forward, the three upper sector fields being provided for the region in front of the helicopter. The terrain/obstacle situation below the helicopter is represented at the bottom right in the form of a vertical scale—in imitation of the representation of a radar altimeter. All the distance warnings may preferably be bolstered by differing warning tones.

BRIEF DESCRIPTION OF THE DRAWINGS

The invention is described in the following on the basis of an exemplary embodiment which is represented more or less schematically in the drawing. Shown in detail are.

DETAILED DESCRIPTION

Figure 1:
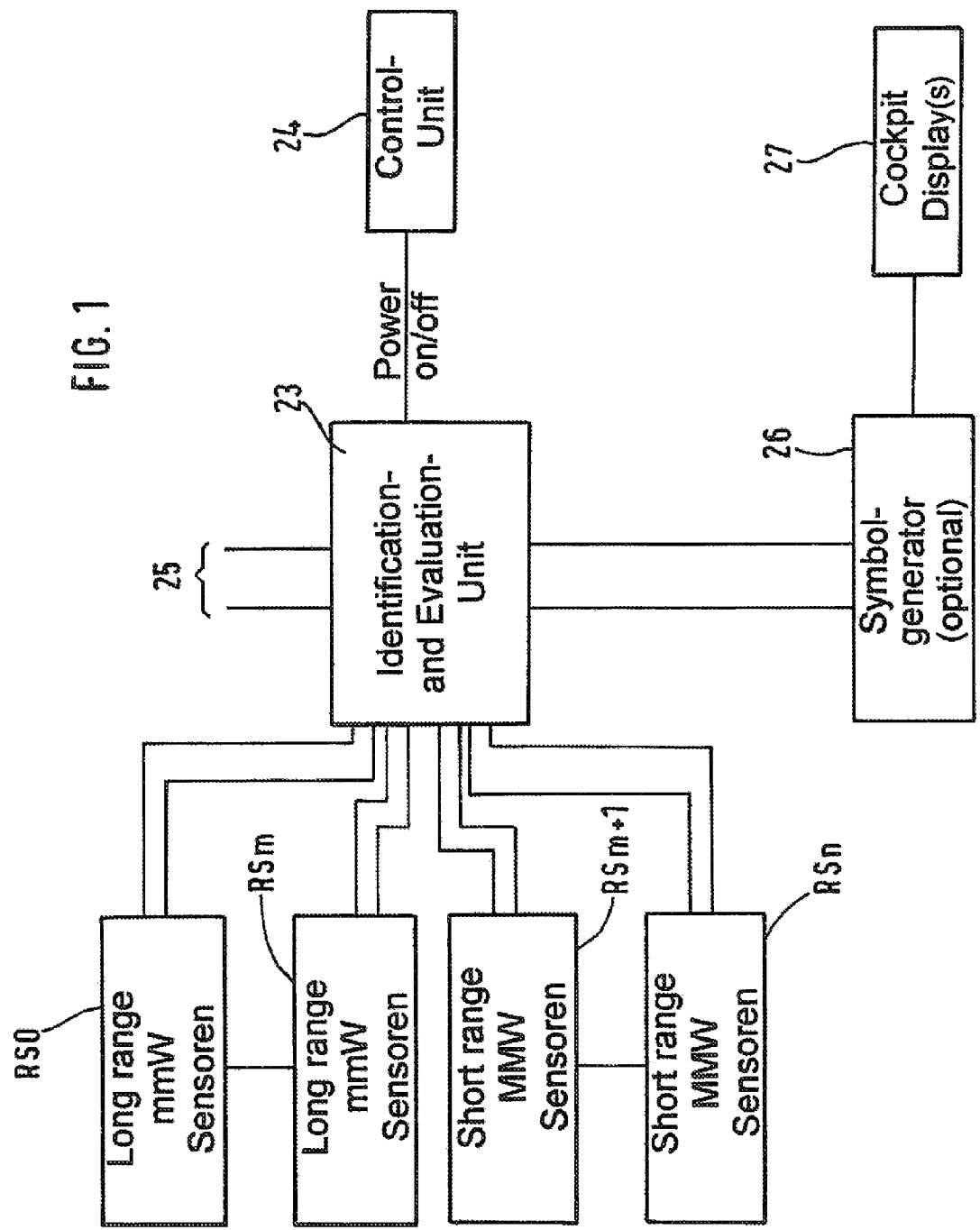
FIG. 1 a block diagram of the panoramic warning system for helicopters according to the invention.
Figure 2:
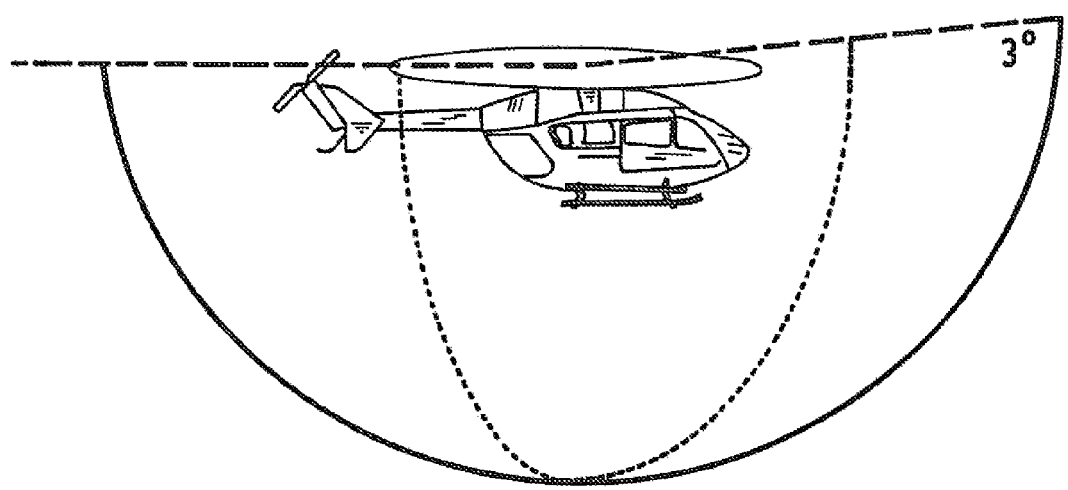
FIG. 2 the scan sectors of the panoramic warning system according to FIG. 1.
Figure 2:
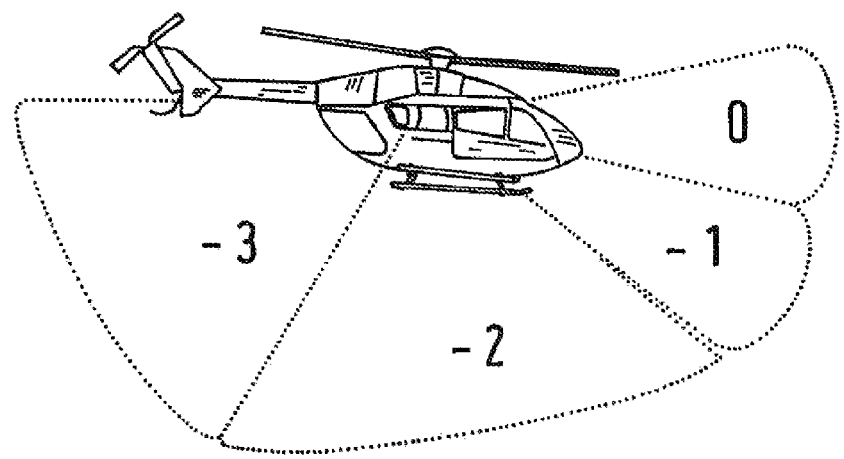
Figure 2:
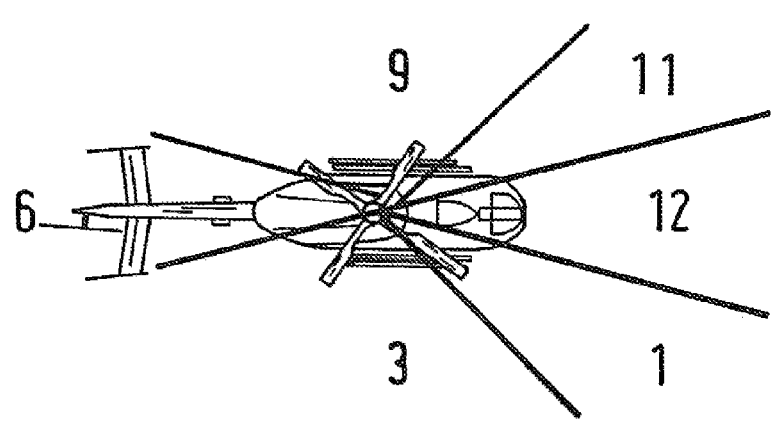
Figure 3:
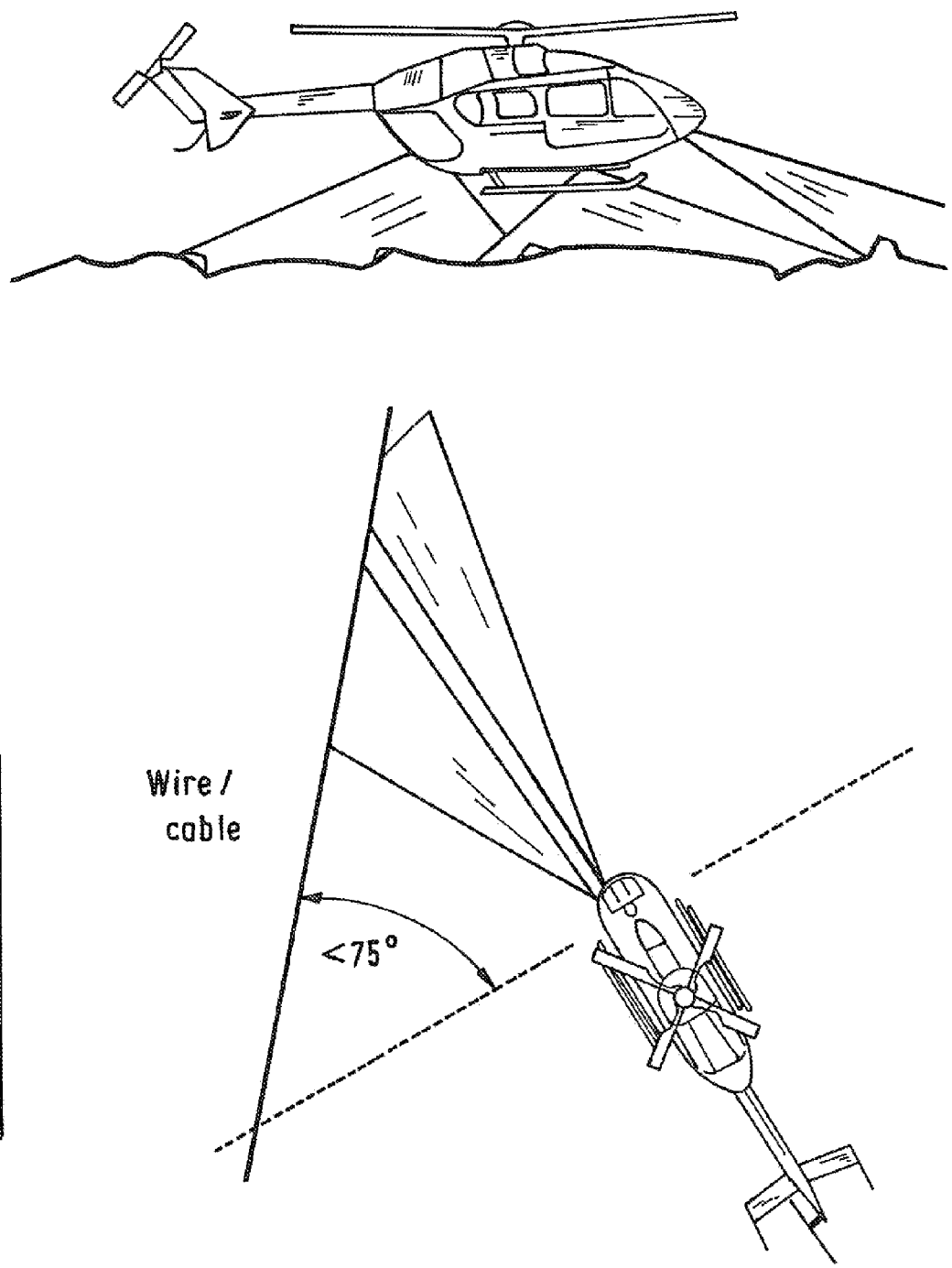
FIG. 3 the scan situation in respect of cross-country power transmission lines and mountain edges.

For the purpose of monitoring the regions represented in FIGS. 2 and 3—designated by means of index numbers 0, −1, −2, −3 and 1, 3, 6, 9, 11, 12, respectively—around a helicopter HS, use is made of a plurality of radar sensors RS distributed in suitable manner on the fuselage structure of the helicopter, of which merely some of the sensors RS0, RSm, RSm+1, RSn have been represented in FIG. 1. The radar sensors RS0 to RSm operate in the long-range region, and the other sensors operate in the short-range region. The signals of the radar sensors representing measured ranges are collected in a central identification-and-evaluation unit 23, evaluated, and assigned to the individual sectors by means of amplitude demodulation or frequency demodulation via the individual identifier/footprint. The identification-and-evaluation unit and consequently the individual radar sensors are capable of being switched on via a control unit 24. In the identification-and-evaluation unit the comparison of the incoming signals with presentable warning thresholds takes place, as does the conversion of the supplied signals—with the aid of a symbol generator 26—into display signals for the cockpit displays, of which likewise only one display 27 has been represented in FIG. 1. The setting of the warning thresholds is either effected from the cockpit or may be carried out from outside by means of an external data link 25. The signals of the aforementioned regions—cf. FIG. 2—of the radar sensors are, as already mentioned, characterized by so-called footprints generated by means of amplitude modulation or frequency modulation, in order to enable the selective processing in the identification-and-evaluation unit and also the selective display.

Figure 4:
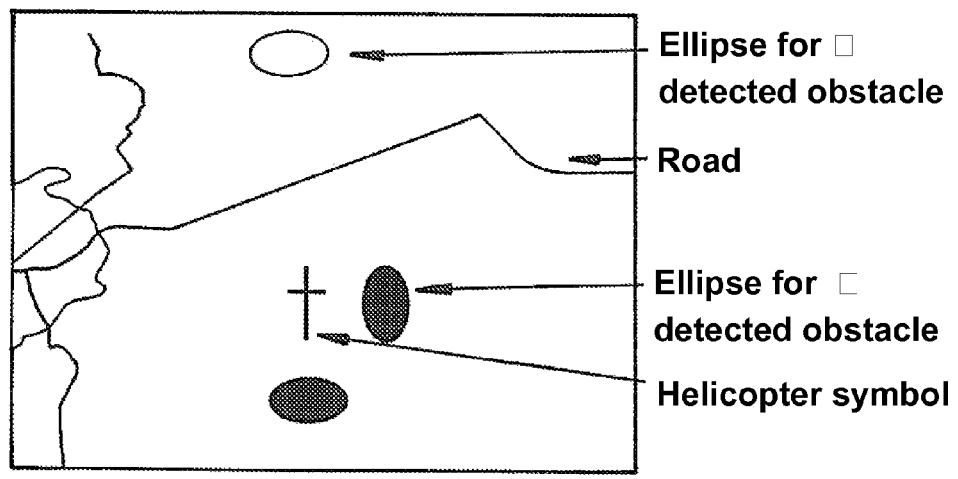
FIG. 4 the display of a cockpit display for a navigation-and-mission display.
Figure 5:
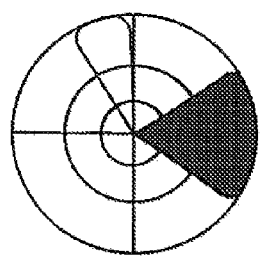
FIG. 5 the display of a cockpit display with a representation of a hovering flight for the panoramic warning system according to FIG. 1 and FIG. 6 the display of a cockpit display with an OTPS representation of the warning signals according to the panoramic warning system shown in FIG. 1.

The representation in the cockpit displays of the signals of the radar sensors RS0 to RSn, which are processed in the central identification-and-evaluation unit 23, may, as FIG. 4 shows, be effected in the form of a navigation-and-mission display (NMD), the detected obstacles being represented, colored red or yellow, in relation to the helicopter HS, which is represented as a cross, in the form of ellipses in range and direction relative to the helicopter. A primary flight display (PFD), called an unidirectional display or a hovering-flight display, is represented in FIG. 5, in which the horizontal hazards per sector according to FIG. 2 are represented by yellow and red colorings.

Figure 6:
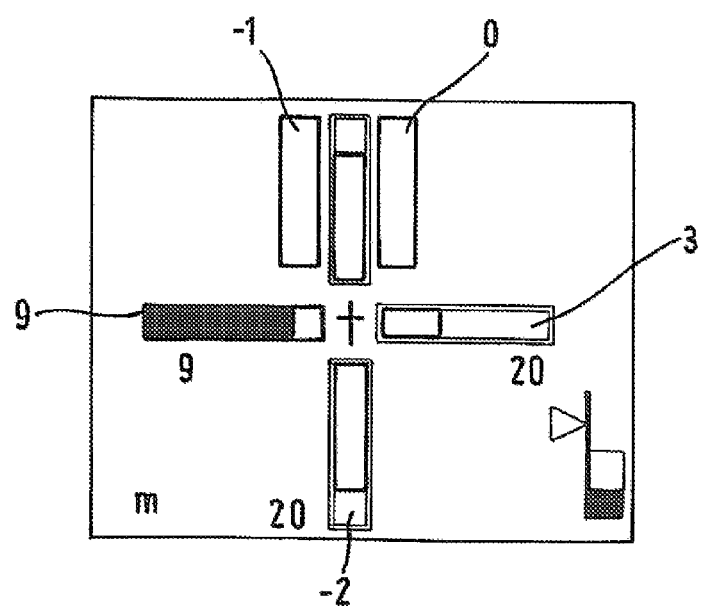

Finally, FIG. 6 shows a so-called OTPS (Obstacle and Terrain Proximity Sensing) representation which shows the spatial hazard picture of the helicopter which is represented as a symbol. To this end, the ranges to obstacles, to the extent that these obstacles have been detected by the radar sensors, are inserted numerically in feet or meters. The scales have range-dependent, yellow or red bars, depending on the degree of hazard. In FIG. 6 the directions that are represented embody right, rearward, left and forward, the upper sector fields being provided for the region in front of the helicopter; cf. also FIG. 2. The terrain/obstacle situation below the helicopter is represented at the bottom right in the form of a vertical scale—in imitation of the representation of a radar altimeter.

What is claimed is:

1. A panoramic warning system for a helicopter for detecting obstacles and the proximity of the ground, the system comprising:
   a plurality of radar sensors connected to a fuselage structure of the helicopter, assigned to different sectors of a sphere surrounding the helicopter, and producing radar beams at different wavelengths;
   a central identification-and-evaluation unit, wherein the plurality of radar sensors are configured to communicate signals representing range information cyclically to the central identification-and-evaluation unit;
   a cockpit display configured to represent the signals after the signals are edited and compared with predetermined warning thresholds, wherein the radar sensors assigned to sectors of the sphere below, behind and to the side of the helicopter operate with a short-range wavelength, and the radar sensors assigned to sectors of the sphere in front of the helicopter operate with a long-range wavelength, and wherein reflected radar beams include a superimposed identifier via at least one of an amplitude modulation or a frequency modulation, the identifier enabling at least one of a correct mapping to the respective sectors and a differentiation between different aircraft.

2. The panoramic warning system as recited in claim 1, further comprising a common identification unit configured to provide the identifier for the signals.

3. The panoramic warning system as recited in claim 1, wherein the radar sensors operating with the short-range wavelength are assigned to scanning of side regions, lower regions and rear regions of the helicopter and radar sensors operating with the long-range wavelength are assigned to scanning of the front region in front of the helicopter.

4. The panoramic warning system as recited in claim 1, wherein the predetermined warning thresholds are adjustable.

5. The panoramic warning system as recited in claim 4, wherein the predetermined warning thresholds are adjustable via an external data-link circuit.

6. The panoramic warning system as recited in claim 1, wherein horizontal hazards in each region are capable of being represented for the hovering-flight region by colourings of the display indication in yellow and red.

7. The panoramic warning system as recited in claim 1, wherein the cockpit display is configured to represent hazard situations as ellipses coloured red or yellow.

8. The panoramic warning system as recited in claim 1, wherein the cockpit display provides a joint display for all flight attitudes in the form of a spatial hazard picture of the helicopter.

* * * * *